United States Patent [19]

Watanabe et al.

[11] Patent Number: 5,695,866
[45] Date of Patent: Dec. 9, 1997

[54] OPTICAL RECORDING MEDIUM

[75] Inventors: Yuji Watanabe; Gentaro Ohbayashi; Kusato Hirota, all of Otsu, Japan

[73] Assignee: Toray Industries Inc., Tokyo, Japan

[21] Appl. No.: 638,876

[22] Filed: Apr. 25, 1996

Related U.S. Application Data

[63] Continuation of Ser. No. 429,013, Apr. 26, 1995, abandoned, which is a continuation of Ser. No. 970,861, Nov. 3, 1992, abandoned.

[30] Foreign Application Priority Data

Nov. 7, 1991 [JP] Japan ................... 3-291490
Dec. 3, 1991 [JP] Japan ................... 3-319123
Dec. 3, 1991 [JP] Japan ................... 3-319124

[51] Int. Cl.[6] ........................... G11B 05/66
[52] U.S. Cl. .............. 428/216; 428/64.3; 428/64.4; 428/64.5; 428/336; 428/688; 428/694 DE; 428/694 XS; 428/694 RL; 428/698; 428/704; 428/913
[58] Field of Search ............ 428/64, 65, 694 DE, 428/694, 694 RL, 64.3, 64.4, 64.5, 216, 336, 688, 698, 704, 913; 369/13; 365/122

[56] References Cited

U.S. PATENT DOCUMENTS

| 4,661,420 | 4/1987 | Nakamura | 428/694 |
| 4,676,646 | 6/1987 | Strand et al. | 356/381 |
| 4,839,883 | 6/1989 | Nagata et al. | 369/286 |
| 4,847,132 | 7/1989 | Takao et al. | 428/64 |
| 5,032,470 | 7/1991 | Shindo et al. | 428/694 |
| 5,098,761 | 3/1992 | Watanabe et al. | 428/64 |

FOREIGN PATENT DOCUMENTS

| 58-215744 | 12/1983 | Japan . |
| 59-110052 | 6/1984 | Japan . |
| 60-131659 | 7/1985 | Japan . |
| 157347 | 7/1987 | Japan . |
| 171142 | 7/1989 | Japan . |

*Primary Examiner*—Stevan A. Resan
*Attorney, Agent, or Firm*—Armstrong, Westerman, Hattori, McLeland, & Naughton

[57] ABSTRACT

An optical recording medium comprising a substrate and, provided thereon, a recording layer and a dielectric layer, wherein the dielectric layer comprises a dielectric comprised of a chalcogenide and carbon (C).

20 Claims, No Drawings

OPTICAL RECORDING MEDIUM

This application is a continuation of application Ser. No. 08/429,013 filed Apr. 26, 1995 now abandoned, which is a continuation of application Ser. No. 07/970,861 filed Nov. 3, 1992, now abandoned.

BACKGROUND OF THE INVENTION

(1) Field of the Invention

The present invention relates to an optical recording medium capable of recording and reading information by irradiation of a light beam.

(2) Description of the Related Art

In conventional optical recording medium, the characteristics of the recording layer for recording, reading information or erasing information through the utilization of an optical change become degraded during storage and transportation, because the recording layer is susceptible to oxidative corrosion by moisture and oxygen in the air. In the case of rewritable optical recording media, the recording layer becomes unstable because its recording and erasing characteristics are degraded after a number of recording and erasing cycles.

In order to eliminate the above-described drawbacks, a proposal has been made on an optical recording medium provided with a dielectric layer for protecting the recording layer. The dielectric layer should have fundamental properties such as optical transparency, excellent adhesion to the recording layer, heat resistance and mechanical properties to such an extent that neither minute cracking nor peeling occurs even when exposed to thermal or mechanical stresses during recording or erasing, chemical stability and prevention of change in the film quality of the recording layer attributable to oxygen, moisture, etc.

Examples of such an optical recording medium include one proposed in U.S. Pat. No. 4,847,132 wherein a film is formed by subjecting a mixture of a chalcogenide, such as ZnS, ZnSe or ZnTe, with an oxide, such as $SiO_2$, $GeO_2$, $SnO_2$, $In_2O_3$ or $TeO_2$, to thin film deposition, such as vacuum deposition, sputtering or the like. According to the studies conducted by the present inventors, however, in the above-described thin film deposition by vacuum deposition, a large intrinsic stress occurs within the film, that is, the dielectric layer. For this reason, as described above, when the optical recording medium is exposed to thermal or mechanical stresses during recording or erasing, the intrinsic stresses of the dielectric layer functions as compressive stresses, which gives rise to problems such as warping, peeling of the film (dielectric layer) and occurrence of cracking unfavorably.

In order to eliminate the above-described draw-backs, the present inventors proposed in U.S. Pat. No. 5,098,761 an optical recording medium provided with a dielectric layer comprising a mixture of a chalcogenide with a fluoride, such as $MgF_2$, $CeF_2$ or $ThF_4$. Since, however, this optical recording medium is unsatisfactory in the relaxation of the intrinsic stresses of the dielectric layer, warping often occurs in the optical recording medium. Further, in the case of the rewritable optical recording medium, recording and erasing characteristics are unsatisfactory.

SUMMARY OF THE INVENTION

An object of the present invention is to provide a high-quality optical recording medium which not only meets the requirements for the fundamental properties of the dielectric layer, such as optical transparency, adhesion to the recording layer, heat resistance, mechanical properties, interception of gas such as oxygen, water resistance and low hygroscopicity, but also is reduced in the intrinsic stress generated within the dielectric layer itself and in the mechanical deformation such as warping.

Another object of the present invention is to provide an optical recording medium which is excellent not only in mechanical properties capable of reducing the burden on a system involving recording, erasing and reading information, but also in adhesion between the dielectric layer and the recording layer, free from occurrence of peeling and cracking, excellent in an ability shield of oxygen, moisture, etc., and capable of preventing a change in the quality of a film of the recording layer and a deterioration in the performance, and ensuring a long-term reliability.

A further object of the present invention is to provide a rewritable optical recording medium which permits a good recording and erasing cycling.

The above-described objects of the present invention can be attained by an optical recording medium comprising a substrate, a recording layer and a dielectric layer, characterized in that the dielectric layer comprises a dielectric comprising at least a chalcogenide and carbon (C).

The dielectric layer comprising a dielectric comprised of a chalcogenide and carbon (C) enables the dielectric layer to be firmly bonded to the recording layer and, at the same time, the intrinsic stress within the film to be reduced, which contributes to the prevention of warping and peeling of the dielectric layer and the prevention of occurrence of cracking. Further, the dielectric layer is excellent in low hygroscopicity and the ability to shield moisture and oxygen, which prevents the change in the film quality and the deterioration in the performance of the recording layer, so that the long-term reliability of the optical recording medium can be ensured. Further, in the case of a rewritable optical recording medium, since the intrinsic stress within the dielectric layer can be reduced as described above, mechanical breakage of the dielectric layer due to the thermal cycle of heating and cooling during rewriting, peeling of the dielectric layer from the recording layer and the flow of the material constituting the recording layer in the direction of the track are reduced, which enables good recording and erasing characteristics to be ensured.

Further, since the optical recording medium according to the present invention is reduced in the intrinsic stress generated in the film of the dielectric layer itself, it is possible to prevent the occurrence of minute peeling of the dielectric layer, cracking, deterioration of the recording layer, etc., which occur in recording and erasing cycles as the case may be. Further, the dielectric layer, as such, thermally expands due to the heat generated during recording and erasing, which often causes the material constituting the recording layer to flow in the direction of the track. This phenomenon is thought to be causative of the deterioration of the recording and erasing characteristics caused by recording and erasing cycles. The optical recording medium according to the present invention reduces the amount of flow of the material constituting the recording layer in the direction of the track and prevents the deterioration of the recording and erasing characteristics.

DETAILED DESCRIPTION OF THE PREFERRED EMBODIMENTS

Examples of the chalcogenide to be used in the present invention include sulfides, selenides and tellurides. Specific examples thereof include sulfides, selenides and tellurides such as ZnS, ZnSe, ZnTe, PbS, PbSe and PbTe. Among them, ZnS, ZnSe and ZnTe are preferred. Since these substances have a high heat resistance, even when the dielectric layer is heated during recording operation, it is neither broken nor undergoes spoiling of the mechanical properties.

Regarding the composition of the chalcogenide and carbon constituting the dielectric according to the present invention, when the composition of the dielectric is represented by the following formula $$A_{(1-x)}C_x$$

wherein A represents the chalcogenide, (1-x) represents the molar ratio of the chalcogenide, C represents carbon and x represents the molar ratio of carbon, x is preferably in the range of from 0.02 to 0.80, still preferably in the range of from 0.05 to 0.50. The above-described composition enables the object of the present invention to be attained through a reduction in the intrinsic stress generated within the dielectric layer.

In the present invention, in order to further reduce the intrinsic stress of the dielectric layer without detriment to the recording characteristics of the recording layer and adjust the refractive index, the dielectric preferably comprises a chalcogenide and carbon and, added thereto, at least one member selected from the group consisting of metals, metalloids and their oxides, nitrides, fluorides and carbides. Among them, oxides, nitrides and fluorides of metals and metalloids are preferred.

In the dielectric comprising either the above-described chalcogenide and carbon (C), or chalcogenide, carbon (C) and at least one of the above-described oxides, nitrides, fluorides and carbides of metals or metalloids, two or more materials are mixed together at the several nanometer or below scale or at the order of an atomic level or those materials which are aggregates of grains of several nanometers or below, and part or the whole of the grains of which are arranged in a regular laminar structure in the unit of several nanometer or below.

Examples of the oxide of the metal or metalloid include oxides of metals or metalloids belonging to the group III, IV and V of the periodic table, for example, oxides of Si, Al, Ti, Ta, Zr, etc., and specific examples thereof include $SiO_2$, $SiO$, $Sl_2O_3$, $TiO_2$, $Ta_2O_5$ and $ZrO_2$.

When the composition of a chalcogenide, carbon and an oxide of a metal or metalloid constituting the dielectric is represented by the formula $$[A_{(1-y)}O_y]_{(1-x)}C_x$$

wherein A represents the chalcogenide, (1-x) represents the molar ratio of the chalcogenide, C represents carbon, x represents the molar ratio of carbon, O represents the oxide of a metal or metalloid and y represents the molar ratio of the oxide of a metal or metalloid, y is preferably in the range of from 0.02 to 0.50 and x is preferably in the range of from 0.05 to 0.80. Still preferably x is in the range of from 0.10 to 0.50 and y is in the range of from 0.05 to 0.35. When x and y values are in the above-described respective ranges, the object of the present invention can be attained. In particular, the hydroscopicity of the dielectric layer can be lowered, which contributes to a further improvement in the interception of oxygen, moisture, etc.

Examples of the nitride of the metal or metalloid include nitrides of metals or metalloids belonging to the Group III, IV and V of the periodic table, for example, nitrides of Si, Al, Ti, Ta and Zr. Specific examples thereof include $Si_3N_4$, AlN, TiN, TaN and ZrN.

When the composition of a chalcogenide, carbon and a nitride of a metal or metalloid constituting the dielectric is represented by the formula $$[A_{(1-y)}N_y]_{(1-x)}C_x$$

wherein A represents the chalcogenide, (1-x) represents the molar ratio of the chalcogenide, C represents carbon, x represents the molar ratio of carbon, N represents the nitride of a metal or metalloid and y represents the molar ratio of the nitride of a metal or metalloid, y is preferably in the range of from 0.02 to 0.50 and x is preferably in the range of from 0.01 to 0.50. Still preferably y is in the range of from 0.05 to 0.35 and x is in the range of from 0.05 to 0.30. When x and y values are in the above-described respective ranges, the object of the present invention can be attained. In particular, the intrinsic stress of the dielectric layer can be effectively reduced.

Examples of the fluoride of the metal or metalloid include fluorides of metals or metalloids belonging to the Group I, II and III of the periodic table, for example, $MgF_2$, $CeF_3$, LiF, $ZrF_4$, $ThF_4$, $LaF_3$, $NdF_3$, $Na_3AlF_6$ and $CaF_2$. Among them, $MgF_2$, $CeF_3$, LiF and $ZrF_4$ are preferred.

When the composition of a chalcogenide, carbon and a fluoride of a metal or metalloid constituting the dielectric is represented by the formula $$[A_{(1-y)}F_y]_{(1-x)}C_x$$

wherein A represents the chalcogenide, (1-y) represents the molar ratio of the chalcogenide, F represents the fluoride, y represents the molar ratio of the fluoride, C represents carbon and x represents the molar ratio, y is preferably in the range of from 0.02 to 0.60, still preferably in the range of from 0.05 to 0.40 and x is preferably in the range of from 0.05 to 0.80, still preferably in the range of from 0.10 to 0.50. When x and y values are in the above-described respective ranges, the object of the present invention can be attained and, at the same time, the degree of freedom of the optical design in optical recording medium can be markedly increased, which facilitates the formation of a dielectric layer having an optically optimal refractive index. For example, when the dielectric layer comprises ZnS having a refractive index of 2.3 or ZnTe having a refractive index of 2.7, $MgF_2$ having a refractive index of 1.37 or $CeF_3$ having a refractive index of 1.6 and carbon having a refractive index of 2 to 3, a dielectric having an arbitrary refractive index intermediate between those of the chalcogenide, the fluoride compound and the carbon can be prepared by varying the mixing ratio of the chalcogenide, the fluoride compound and carbon. Therefore, since the use of this dielectric layer makes it possible to adopt the most appropriate design of the layer structure for recording and erasing while satisfying the recording layer protective characteristics, its stability in storage is excellent and good recording sensitivity and/or erasability can be obtained.

Examples of the carbide of the metal or metalloid include ZrC and TiC.

In the optical recording medium of the present invention, the thickness of the dielectric layer is preferably in the range of from 3 to 500 nm, still preferably in the range of from 10 to 300 nm. When the thickness of the dielectric layer is less than 3 nm, the dielectric layer cannot shield oxygen, moisture or the like, sufficiently, so that it cannot protect the recording layer sufficiently. When this thickness is larger than 500 nm, the intrinsic stress of the dielectric layer becomes so large that not only peeling and cracking are liable to occur but also mechanical deformation (such as warping) of the optical recording medium is liable to occur.

The optical recording medium of the present invention comprises at least a substrate and, formed thereon, a recording layer and a dielectric layer, and the dielectric layer can be disposed on one or both surfaces of the recording layer adjacent thereto.

Any known optical recording layer can be used as the recording layer in the present invention. It is possible to use those materials which cause a change in the crystal structure of the recording layer by the irradiation of a laser beam focused on the recording layer (e.g., from the crystalline state to an amorphous state or vice versa, or from the hexagonal crystal to a cubic crystal or vice versa), in other words, those materials which can record information through phase change. Examples of such materials include a TeGe-based material, a SnTeSe-based material, an SbTeGe-based material, an InSe-based material and those modified by adding small amounts of metals or other materials to these alloys. Examples of the material which records information through the reversal of magnetization by irradiation of a laser beam focused on the magnetic recording layer include TbFeCo.

In the phase-change type recording layer, the thermal or mechanical load is large during recording and erasing of information. In particular, in the case of a rewritable recording layer, since the above-described load is repeatedly applied, the application of the dielectric layer according to the present invention is very useful. Specific examples of the phase-change type rewritable recording layer include an SbTeGe-based material. A recording layer comprising at least one metal selected from the group consisting of Pd, Ni, Ag, Au, Co, Pt, Nb and Ti, and further Sb, Ge and Te is excellent in the recording characteristics. When the composition of the recording layer is expressed by the following formula:

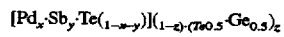

where x represents the atomic ratio of Pb, y represents the atomic ratio of Sb and z represents the atomic ratio of (Te-Ge), it is preferred that x, y and z be in the range of from 0.001 to 0.10, in the range of from 0.45 to 0.65 and in the range of from 0.2 to 0.4, respectively, because such a recording layer has excellent recording and erasing characteristics.

The substrate to be used in the present invention may be any one used in the conventional optical recording medium, such as plastics, glasses and aluminum. A transparent material is used preferably as the substrate when any influence of dust or the like adhering to the optical recording medium must be avoided through recording, erasing or reading by making use of a focused beam from the substrate side. Examples of the materials described above include a polyester resin, an acrylate resin, a polycarbonate resin, an epoxy resin, a polyolefin resin, a styrene resin, glass, and so forth. Preferred are polymethyl methacrylate, polycarbonate and epoxy resin because they have a small birefringence and can be molded easily. Though the thickness of the substrate is not particularly limited, the thickness is preferably in the range of from 10 μm to 5 mm. When the thickness is less than 10 μm, the optical recording medium is susceptible to dust, etc. adhered to the optical recording medium even though recording, reading or erasing is conducted by means of a focused beam from the substrate side. On the other hand, when the thickness exceeds 5 mm, and recording, reading or erasing is conducted by means of a focused beam, the numeric aperture of an objective lens cannot be increased, which increases the pit size, so that it becomes difficult to increase the recording density.

The substrate may be either flexible or rigid. The flexible substrate can be used in a tape form, a card form or a round sheet form. The rigid substrate can be used in a card form or a disk form.

The light to be used for recording, reading or erasing in the optical recording medium of the present invention is a laser beam or a strobe light, and a semiconductor laser beam is particularly preferred because the light sources can be made compact, their power consumption is low and modulation is easy.

The optical recording medium of the present invention may have a structure, for example, wherein the recording layer is formed on the substrate and the dielectric layer comprising a chalcogenide and carbon is formed on the recording layer, or a structure wherein the first dielectric layer, the recording layer and the second dielectric layer are laminated sequentially in that order on the substrate.

When signals are read by utilizing the change in the reflectance of the recording layer, a reflecting layer of a metal (e.g. Al, Al alloy, Au, NiCr, etc.) may be disposed on one side of the recording layer opposite to the side on which light is incident. Furthermore, an intermediate layer may be interposed between the recording layer and the reflecting layer, and the dielectric layer of the present invention can be used as this intermediate layer (second electric layer).

The optical recording medium having the structure wherein the recording layer, the dielectric layer and optionally the reflecting layer are disposed on the substrate can be used as a single sheet by disposing a resin layer such as a layer of an UV-curing resin further thereon. Alternatively, it may have an air sandwich structure, an air incident structure or a laminated structure for lamination with other member or with another substrate of the same kind.

The well-known thin film deposition method such as vacuum evaporation, sputtering, ion plating and CVD can be employed in order to form the recording layer, the dielectric layer and the reflecting layer which is disposed according to need.

In the case of vacuum evaporation, the dielectric layer comprising a chalcogenide and carbon (C) can be formed by co-evaporating the chalcogenide and carbon from separate evaporation sources or by mixing the chalcogenide and the carbon in a predetermined mixing ratio and evaporating the mixture from one evaporation source. In the case of sputtering, a target made of a chalcogenide material and a target made of carbon are co-sputtered or a target prepared by previously mixing the chalcogenide material and carbon in a predetermined mixing ratio is sputtered.

Further, in the present invention, when at least one member selected from the group consisting of the above-described oxides, nitrides, fluorides and carbides of the metals or metalloids is added to the constituent ingredients of the dielectric material, evaporation is conducted by co-evaporating these additives from an evaporation source separate from the evaporation sources of the chalcogenide and carbon. Alternatively, a target is prepared by previously mixing the chalcogenide with at least one member selected from the oxides, nitrides, fluorides and carbides of the metals or metalloids in a predetermined mixing ratio, and this target and the target comprising carbon are simultaneously sputtered.

Next, the method of forming the optical recording medium of the present invention composed of the substrate, the recording layer and the dielectric layer will be described by way of example.

A polycarbonate disk is used as the substrate and co-sputtering is effected by use of, for example, a ZnS target and a C (graphite) target to form the first dielectric layer. Next, the recording layer is formed by sputtering on the dielectric layer by use of the target of the recording layer material, and second dielectric layer is formed on this recording layer in the same manner as that described above.

The sputtering method is not particularly limited. For example, RF magnetron sputtering in an Ar (argon) gas can be used, and it is effective to rotate the substrate in order to uniform the composition and the film thickness on the substrate.

In the method described above, the composition of the dielectric layer is controlled by the deposition rate from each target. More particularly, the relation between the power supplied to each target and the deposition rate is examined in advance and a power corresponding to a desired deposition rate can be supplied or a supply power can be controlled by monitoring the deposition rate with a quartz crystal thickness monitor, for example.

The degree of vacuumness during sputtering is not particularly limited and is approximately from $5 \times 10^{-2}$ Pa to approximately 3 Pa, for example.

In the optical recording medium according to the present invention, since the dielectric constituting the dielectric layer comprises at least a chalcogenide and carbon (C), the following excellent effects can be attained.

(1) The adhesion of the dielectric layer to the recording layer is excellent, mechanical properties are good, and the intrinsic stress within the dielectric layer is small, so that the occurrence of warping, peeling, cracking, etc., can be suppressed, which contributes to a remarkable reduction in the burden on a system involving recording and reading.

(2) In the storage under high temperature and high humidity conditions, recording characteristics are not deteriorated, so that a long-term reliability can be ensured.

(3) In the case of a rewritable optical recording medium, rewriting can be conducted a plurality of times.

(4) When the dielectric comprises a chalcogenide and carbon and, added thereto, fluoride, it is possible to control the refractive index through a variation in the composition ratio, which contributes to a remarkable improvement in the degree of freedom of the optical design of the optical recording medium.

The present invention will now be described in more detail with reference to the following Examples, though it is not limited to these Examples only.

The composition of the dielectric according to the present invention was confirmed by ICP (inductively coupled plasma atomic emission spectroscopy) and an electric furnace-nondispersive infrared absorption method.

EXAMPLE 1

A ZnS target, a C (graphite) target and a Te(50%)-Ge(41%)-Ga(2%)-Bi(7%) (atomic %) target as a phase-change write once optical recording material were set in a sputtering device where three targets can be set and co-sputtering can be conducted. Further, a disk substrate (130 mm write once ISO standard format, made of poly-carbonate, thickness of 1.2 mm) was set therein. The inside of the sputtering chamber was pumped down to $2.0 \times 10^{-4}$ Pa, and an Ar gas was introduced thereinto up to a pressure of $3.0 \times 10^{-1}$ Pa. Then, in order to uniform the film thickness and composition, the substrate was rotated and revolved, and two targets were subjected to co-sputtering by the RF magnetron sputtering method while controlling the supply of power to the targets so that the deposition rate was 70% by mole for ZnS and 30% by mole for C until the sum of the thickness monitor values became 80 nm, thereby forming a first dielectric layer. Then, the Te(50%)-Ge(41%)-Ga(2%)-Bi(7%) (atomic %) target was subjected to sputtering until the thickness monitor value became 100 nm, thereby forming a recording layer on the first dielectric layer. Further, a 90 nm-thick second dielectric layer comprising 70% by mole of ZnS and 30% by mole of C was formed on the recording layer in the same manner as that described above. Thus, the following three-layer structure was formed: substrate/first dielectric layer comprising ZnS (0.70) and C (0.30)/recording layer/second dielectric layer comprising ZnS (0.70) and C (0.30). An 8 µm-thick UV-curing resin layer was provided on the second dielectric layer of the three-layer structure to give an optical recording medium.

The optical recording medium thus prepared was subjected to measurement of mechanical characteristics. As a result, the maximum tilt was found to be 4.3 mrad. The ISO standard value of the maximum tilt in a 130 mm write once optical disk is 5 mrad or less. Since this optical recording medium satisfies this standard even in a single sheet structure, better mechanical properties can be expected after lamination. 1.5 T signal (3.7 MHz) was recorded on 2000 tracks of track Nos. 1001 to 3000 through the use of an optical head having a numeric aperture of 0.53 in the objective lens and a wavelength of a semiconductor laser of 830 nm under conditions of a rotational speed of 1800 rpm, a peak power of 10 mW and a recording pulse width of 80 ns to measure BER (bit error rate). As a result, the BER (bit error rate) value was found to be $3.5 \times 10^{-6}$. This recording medium was stored in an environment of 90° C. and 80% RH for 1500 hr. Thereafter, tracks Nos. 1001 to 3000 were read to measure BER. As a result, the BER value was found to be $4.2 \times 10^{-6}$. That is, scarcely any deterioration was observed in the BER, and it was found that the optical recording medium had an excellent long-term reliability.

EXAMPLE 2

A three-layer structure comprising substrate/ first dielectric layer comprising ZnSe (0.60) and C (0.40)/ recording layer/second dielectric layer comprising ZnSe (0.60) and C(0.40) was formed in the same manner as that of Example 1 with all of the substrate, sputtering pressure condition, each layer thickness, etc., being the same as those of Example 1, except that a ZnSe target was set instead of the ZnS target. An 8 µm-thick UV-curing resin layer was provided on the second dielectric layer of the three-layer structure to give an optical recording medium.

The optical recording medium thus prepared was subjected to measurement of mechanical characteristics. As a result, the maximum tilt was found to be 4.7 mrad. Since this optical recording medium satisfies the ISO standard even in a single plate structure, better mechanical properties can be expected after lamination.

1.5 T signal (3.7 MHz) was recorded on 2000 tracks of tracks Nos. 1001 to 3000 under conditions of a peak power of 8 mW and a recording pulse width of 100 ns to measure BER (bit error rate) in the same manner as that of Example 1. As a result, the BER value was found to be $2.6 \times 10^{-6}$. This recording medium was stored in an environment of 90° C. and 80% RH for 1500 hr. Thereafter, tracks Nos. 1001 to 3000 were read to measure BER. As a result, the BER value was found to be $3.8 \times 10^{-6}$. That is, scarcely any deterioration was observed in the BER, and it was found that the optical recording medium had an excellent long-term reliability.

COMPARATIVE EXAMPLE 1

A three-layer structure comprising substrate/first dielectric layer comprising ZnS/recording layer/second dielectric layer comprising ZnS/reflective layer was formed in the same manner as that of Example 1 with all of the substrate, sputtering pressure condition, each layer thickness, etc., being the same as those of Example 1, except that no C target was set. An 8 μm-thick UV-curing resin layer was provided on the second dielectric layer of the three-layer structure to give an optical recording medium. The optical recording medium thus prepared was subjected to measurement of mechanical characteristics. As a result, the maximum tilt was found to be 9.2 mrad.

The BER of the optical recording medium was measured in the same manner as that of Example 1 and found to be $5.0 \times 10^{-6}$. This recording medium was stored in an environment of 90° C. and 80% RH for 1500 hr and BER was measured. As a result, the BER value was found to be increased to $4.1 \times 10^{-4}$, which rendered the optical recording medium unsuitable for practical use.

EXAMPLE 3

A ZnS target, a $SiO_2$ target and a C (graphite) target were set in a sputtering device where three targets can be set and co-sputtering can be conducted. Further, a disk substrate (130 mm rewritable ISO standard format, made of polycarbonate, thickness of 1.2 mm) was set therein. The inside of the sputtering chamber was pumped down to $2.0 \times 10^{-4}$ Pa, and an Ar gas was introduced thereinto up to a pressure of $3.0 \times 10^{-1}$ Pa. Then, in order to uniform the film thickness and composition the substrate was rotated and revolved, three targets were subjected to co-sputtering by the RF magnetron sputtering method while controlling the supply of power to the targets so that the deposition rate was 56% by mole for ZnS, 14% by mole for $SiO_2$ and 30% by mole for C until the total of the thickness monitor value became 220 nm, thereby forming a first dielectric layer. Then, a Pd(1%)-Ge(17%)-Sb(26%)-Te(56%) (atomic %) target as a phase-change rewritable optical recording material was set and then sputtering was effected in the same manner as that described above under an Ar gas pressure of $3 \times 10^{-1}$ Pa until the thickness monitor value became 25 nm, thereby forming a recording layer on the first dielectric layer. Further, a 25 nm-thick second dielectric layer comprising 56% by mole of ZnS, 14% by mole of $SiO_2$ and 30% by mole of C was formed on the recording layer in the same manner as that described above. Thereafter, an Al target was set, and an 80 nm-thick reflective layer was formed in the same manner as that described above under an argon gas pressure of $3.0 \times 10^{-1}$ Pa. Thus, the following four-layer structure was formed: substrate/first dielectric layer comprising [ZnS(0.80)-$SiO_2$(0.20)] (0.70) and C(0.30)/ recording layer/ second dielectric layer comprising [ZnS (0.80)-$SiO_2$(0.20)] (0.70) and C(0.30)/reflective layer. A 10 μm-thick UV-curing resin layer was provided on the reflective layer of the four-layer structure to give an optical recording medium.

The optical recording medium thus prepared was subjected to measurement of mechanical characteristics. As a result, the maximum tilt was found to be 3.4 mrad. The ISO standard value of the maximum tilt in a 130 mm rewritable optical disk is 5 mrad or less. Since this optical recording medium satisfies this standard even in a single sheet structure, better mechanical properties can be expected after lamination.

The whole surface (radius: 28 to 62 mm) of the recording region of the optical recording medium was initialized (crystallized). Alternate overwriting of 1.5 T signal (3.7 MHz) and 4 T signal (1.4 MHz) were conducted through the use of an optical head having a numeric aperture of 0.53 in the objective lens and a wavelength of a semiconductor laser of 830 nm under conditions of a rotational speed of 1800 rpm, a peak power of 10 mW, a recording pulse width of 60 ns and a bottom power of 8.5 mW by making use of one track wherein the initial BER was zero among tracks Nos. 900 to 1000, and the BER of 1.5 T signal was then measured. As a result, the number of recording cycles wherein the BER exceeded $1 \times 10^{-4}$ was found to be 220,000.

Further, 1.5 T signal (3.7 MHz) was recorded in tracks Nos. 1001 to 3000 under the same recording conditions as that used above to measure BER. As a result, the BER value was found to be $1.4 \times 10^{-6}$. This optical recording medium was stored in an environment of 90° C. and 80% RH for 3000 hr, and information recorded in tracks Nos. 1001 to 3000 were read to measure BER. As a result, the BER value was found to be $1.6 \times 10^{-6}$. That is, the deterioration of BER was so small that it was found that the optical recording medium had an excellent long-term reliability.

COMPARATIVE EXAMPLE 2

In Example 3, no C target was set, and only the ZnS target and the $SiO_2$ target were set. Co-sputtering was conducted under substrate, sputtering pressure and other conditions which are the same as those of Example 3 so that the deposition rate was 80% by mole for ZnS and 20% by mole for $SiO_2$, thereby forming a 220 nm-thick first dielectric layer. Then, a 25 nm-thick recording layer was formed on the first dielectric layer in the same manner as that of Example 3. Further, a second dielectric layer comprising 80% by mole of ZnS and 20% by mole of $SiO_2$ was formed in the same manner as that described above. Thus, the following four-layer structure was formed: substrate/first dielectric layer comprising ZnS(0.80) and $SiO_2$(0.20/ recording layer/second dielectric layer comprising ZnS (0.80) and $SiO_2$ (0.20)/reflective layer. A 10 μm-thick UV-curing resin layer was provided on the reflective layer of the four-layer structure to give an optical recording medium.

The optical recording medium thus prepared was subjected to measurement of mechanical characteristics. As a result, the maximum tilt was found to be 5.6 mrad.

The optical recording medium was stored in an environment of 90° C. and 80% RH for 3000 hr, and information was then read to measure BER in the same manner as that of Example 3. As a result, BER was found to be doubled, that is, increased from $3.1 \times 10^{-6}$ to $9.5 \times 10^{-6}$.

EXAMPLE 4

A 100 nm-thick first dielectric layer was formed by sputtering a [ZnSe(0.90)-$TiO_2$(0.10)] (0.80)-C(0.20) (molar ratio) target in the same manner as that of Example 3 with all of the disk substrate and the sputtering pressure condition being the same as those of Example 3, except that the [ZnSe(0.90)-$TiO_2$(0.10)] (0.80)-C(0.20) (molar ratio) target and a Te (50%)-GE(41%)-Ga(2%)-Bi(7%) (atomic %) target as a phase change once write optical recording material were set in a sputtering device. Then, a 100 nm-thick recording layer was formed on the first dielectric layer by sputtering the Te (50%)-Ge(41%)-Ga(2%)-Bi(7%) (atomic %) target. Further, a 120 nm-thick second dielectric layer comprising [ZnSe(0.90)-$TiO_2$(0.10)] (0.80)-C(0.20) (molar ratio) was formed in the same manner as that described above. Thus, the following three-layer structure was formed: substrate/ first dielectric layer comprising [ZnSe (0.90)-$TiO_2$(0.10)]

(0.80) and C(0.20)/recording layer/second dielectric layer comprising [ZnSe(0.90)-TiO$_2$(0.10] (0.80) and C(0.20). A 10 μm-thick UV-curing resin layer was provided on the dielectric layer of the three-layer structure to give an optical recording medium.

The optical recording medium thus prepared was subjected to measurement of mechanical characteristics. As a result, the maximum tilt was found to be 4.2 mrad. Since this optical recording medium sufficiently satisfies the ISO standard even in a single sheet structure, better mechanical properties can be expected after lamination.

Further, information was recorded on tracks Nos. 1001 to 3000 through the use of the same optical head as that of Example 3 under conditions of a rotational speed of 1800 rpm, a peak power of 9.0 mW and a recording pulse width of 90 ns to measure BER. As a result, the BER value was found to be 2.1×10$^{-6}$. This recording medium was stored in an environment of 80° C. and 80% RH for 3000 hr. Thereafter, tracks Nos. 1001 to 3000 were read to measure BER. As a result, the BER value was found to be 3.2×10$^{-6}$. That is, the increase in the BER value was slight, and it was found that the optical recording medium had an excellent long-term reliability.

COMPARATIVE EXAMPLE 3

A three-layer structure comprising substrate/first dielectric layer comprising ZnSe(0.90) and TiO$_2$ (0.10)/recording layer/second dielectric layer comprising ZnSe(0.90) and TiO$_2$ (0.10) was formed in the same manner as that of Example 4 with all of the disk substrate, the sputtering pressure condition, each layer thickness, etc., being the same as those of Example 4, except that a ZnSe(0.90)-TiO$_2$(0.10) (molar ratio) was set instead of the [ZnSe(0.90)-TiO$_2$(0.10)] (0.80)-C(0.20) (molar ratio). Then, a 10 μm-thick UV-curing resin layer was provided on the dielectric layer of the three-layer structure to give an optical recording medium.

This optical recording medium was subjected to measurement of mechanical properties. As a result, the maximum tilt was found to be 5.6 mrad.

The recording medium was stored in an environment of 80° C. and 80% RH for 3000 hr, and information was read to measure BER in the same manner as that of Example 4. As a result, the BER value was found to be increased from 1.9×10$^{-6}$ as the initial BER value to 2.6×10$^{-5}$, that is, increased by a factor of about 10.

EXAMPLE 5

Co-sputtering was conducted in the same manner as that of Example 3 under substrate, sputter and other conditions which are the same as those of Example 3, except that a ZnS target, a MgF$_2$ target and a C (graphite) target were set, so that the deposition rate was 56% by mole for ZnS, 14% by mole for MgF$_2$ and 30% by mole for C, thereby forming a 220 nm-thick first dielectric layer. Then, a recording layer (25 nm), a second dielectric layer (25 nm) and a reflective layer (80 nm) were formed on the first dielectric layer in the same manner as that of Example 3. Thus, the following four-layer structure was formed: substrate/first dielectric layer comprising [ZnS(0.80)-MgF$_2$(0.20] (0.70) and C(0.30) /recording layer/second dielectric layer comprising [ZnS (0.80)/MgF$_2$(0.20)] (0.70) and C(0.30)/reflective layer. A 10 μm-thick UV-curing resin layer was provided on the reflective layer of the four-layer structure to give an optical recording medium.

The optical recording medium thus prepared was subjected to measurement of mechanical characteristics in the same manner as that of Example 3. As a result, the maximum tilt was found to be 1.9 mrad. Since this optical recording medium sufficiently satisfies the ISO standard even in a single sheet structure, better mechanical properties can be expected after lamination.

The whole surface (radius: 28 to 62 nm) of the recording region of the optical recording medium was initialized (crystallized). Alternate overwriting of 1.5 T signal (3.7 MHz) and 4 T signal (1.4 MHz) were repeated through the use of the same optical head as that of Example 3 under conditions of a rotational speed of 1800 rpm, a peak power of 19 mW, a recording pulse width of 60 ns and a bottom power of 8.5 mW by making use of one track wherein the initial BER was zero among tracks Nos. 900 to 1000, and the BER of 1.5 T signal was measured. As a result, the number of recording cycles wherein the BER exceeded 1×10$^{-4}$ was 420,000.

Further, 1.5 T signal (3.7 MHz) was recorded on 2000 tracks of tracks Nos. 1001 to 3000 under the same recording conditions as those described above to measure BER. As a result, the BER value was found to be 1.1×10$^{-6}$. This optical recording medium was stored in an environment of 80° C. and 80% RH for 3000 hr, and information recorded in tracks Nos. 1001 to 3000 were read to measure the BER. As a result, the BER value was found to be 1.1×10$^{-6}$. That is, no deterioration of the BER was observed, and it was found that the optical recording medium had an excellent long-term reliability.

EXAMPLE 6

A 200 nm-thick first dielectric layer was formed by sputtering a [ZnSe(0.90)-CeF$_2$(0.10)](0.80)-C(0.20) (molar ratio) target in the same manner as that of Example 5 under the disk substrate and sputtering pressure conditions which are the same as those of Example 5, except that the [ZnSe (0.90)-CeF$_2$(0.10)] (0.80)-C(0.20) (molar ratio) target and a Pd(3%)-Ge(17%)-Sb(30%)-Te(50%) (atomic %) target as a phase-change rewritable optical recording material were set. Then, a 30 nm-thick recording layer was formed on the first dielectric layer by sputtering the Pd(3%)-Ge(17%)-Sb(30%) -Te(50%) (atomic %) target. A 30 nm-thick second dielectric layer comprising [ZeSe(0.90)-CeF$_2$(0.10)] (0.80) and C(0.20) was formed on the recording layer in the same manner as that described above. Further, an Al target was sputtered to form a 120 nm-thick reflective layer. Thus, the following four-layer structure was formed: substrate/first dielectric layer comprising [ZnSe(0.90)-CeF$_2$(0.10)] (0.80) and C(0.20)/recording layer/second dielectric layer comprising [ZnSe(0.90)-CeF$_2$(0.10)] (0.80) and C(0.20)/reflective layer. A 10 μm-thick UV-curing resin layer was provided on the reflective layer of the four-layer structure to give an optical recording medium.

The optical recording medium thus prepared was subjected to measurement of mechanical characteristics in the same manner as that of Example 5. As a result, the maximum tilt was found to be 2.6 mrad. Since this optical recording medium sufficiently satisfies the ISO standard even in a single sheet structure, better mechanical properties can be expected after lamination. Recording and erasing characteristics were measured in the same manner as that of Example 5 under conditions of a rotational speed of 1800 rpm, a peak power of 18 mW, a recording pulse width of 60 ns and a bottom power of 8 mW. As a result, the number of recording cycles wherein the BER exceeded 1.0×10$^{-4}$ was found to be 280,000.

This optical recording medium was stored in an environment of 80° C. and 80% RH for 3000 hr, and BER was measured. As a result, the BER value was slightly increased from the initial BER value, that is, $2.2 \times 10^{-6}$, to $2.5 \times 10^{-6}$. That is, it was found that the optical recording medium had an excellent long-term reliability.

COMPARATIVE EXAMPLE 4

A 220 nm-thick first dielectric layer was formed by sputtering ZnS in the same manner as that of Example 5 with the substrate and the sputtering pressure condition being the same as those of Example 5, except that only ZnS was set without setting $MgF_2$ target and C target. A 25 nm-thick recording layer was formed on the first dielectric layer in the same manner as that of Example 5. Further, a 25 nm-thick, second dielectric layer comprising ZnS was formed on the recording layer. Further, an 80 nm-thick reflective layer comprising Al was formed on the second dielectric layer in the same manner as that of Example 5. Thus, the following four-layer structure was formed: substrate/first dielectric layer comprising ZnS/recording layer/second dielectric layer comprising ZnS/reflective layer. A 10 μm-thick UV-curing resin layer was provided on the reflective layer of the four-layer structure to give an optical recording medium.

The optical recording medium thus prepared was subjected to measurement of mechanical characteristics in the same manner as that of Example 5. As a result, the maximum tilt was found to be 8.2 mrad. Further, the number of recording cycles was measured and found to be 20,000. This optical recording medium was stored in an environment of 80° C. and 80% RH for 3000 hr, and BER was measured. As a result, the BER value was increased from the initial BER value, that is, $3.8 \times 10^{-6}$, to $2.8 \times 10^{-4}$. This rendered the optical recording medium unsuitable for practical use.

COMPARATIVE EXAMPLE 5

Co-sputtering was conducted in the same manner as that of Example 5 under substrate, sputtering pressure and other conditions which are the same as those of Example 5, except that only a ZnS target and a $MgF_2$ target were set without setting C (graphite) target, so that the deposition rate was 80% by mole for ZnS and 20% by mole for $MgF_2$, thereby forming a 220 nm-thick first dielectric layer. Then, a 25 nm-thick recording layer was formed thereon in the same manner as that of Example 5. Further, a 25 nm-thick second dielectric layer comprising 80% by mole of ZnS and 20% by mole of $MgF_2$ was formed on the recording layer. Thereafter, an 80 nm-thick reflective layer comprising Al was formed on the second dielectric layer in the same manner as that of Example 5. Thus, the following four-layer structure was formed: substrate/first dielectric layer comprising ZnS (0.80) and $MgF_2$ (0.20)/recording layer/second dielectric layer comprising ZnS (0.80) and $MgF_2$ (0.20)/ reflective layer. A 10 μm-thick UV-curing. resin layer was provided on the reflective layer of the four-layer structure to give an optical recording medium.

The optical recording medium thus prepared was subjected to measurement of mechanical characteristics in the same manner as that of Example 5. As a result, the maximum tilt was found to be 5.2 mrad. Further, the number of recording cycles was measured and found to be 90,000. This optical recording medium was stored in an environment of 80° C. and 80% RH for 3000 hr, and BER was measured. As a result, the BER value was increased from the initial BER value, that is, $3.8 \times 10^{-6}$, to $7.2 \times 10^{-6}$, this is, doubled from the initial BER value.

EXAMPLE 7

Co-sputtering was conducted in the same manner as that of Example 3 under substrate, sputtering pressure and other conditions which are the same as those of Example 3, except that a ZnS target, a $Si_3N_4$ target and a C (graphite) target were set, so that the deposition rate was 72% by mole for ZnS, 18% by mole for $Si_3N_4$ and 10% by mole for C, thereby forming a 170 nm-thick first dielectric layer. Then, a target which was the same phase-change rewritable optical recording material as that of Example 3 was sputtered on the first dielectric layer to form a 20 nm-thick recording layer. Further, a 20 nm-thick second dielectric layer was formed in the same manner as that described above, and an Al target was sputtered thereon to form a 100 nm-thick reflective layer. Thus, the following four-layer structure was formed: substrate/first dielectric layer comprising [ZnS (0.80)-$Si_3N_4$ (0.20)] (0.90) and C (0.10)/recording layer/second dielectric layer comprising [ZnS (0.80)-$Si_3N_4$ (0.20)] (0.90) and C (0.10)/reflective layer. A 7 μm-thick UV-curing resin layer was provided on the reflective layer of the four-layer structure to give an optical recording medium.

The optical recording medium thus prepared was subjected to measurement of mechanical characteristics in the same manner as that of Example 3. As a result, the maximum tilt was found to be 3.2 mrad. Since this optical recording medium sufficiently satisfies the ISO standard even in a single plate structure, better mechanical properties can be expected after lamination.

The whole surface (radius: 28 to 62 mm) of the recording region of the optical recording medium was initialized (crystallized). Alternate overwriting of 1.5 T signal (3.7 MHz) and 4 T signal (1.4 MHz) were repeated through the use of the same optical head as that of Example 3 under conditions of a rotational speed of 1800 rpm, a peak power of 19 mW, a recording pulse width of 60 ns and a bottom power of 8.5 mW by making use of one track wherein the initial BER (bit error rate) was zero among tracks Nos. 1001 to 1100, and the BER of 1.5 T signal was measured. As a result, the number of recording cycles wherein the BER exceeded $1 \times 10^{-4}$ was found to be 180,000.

The amount of flow of the material of a recording layer in the direction of the track was measured as follows. Overwriting of 1.5 T signal was conducted 100,000 times on track No. 1500 under the same recording condition as that of the measurement of the number of the recording cycles so that the recording initiation site was random each time, and the length of the portion at the final end of the recording portion of the sector where the reflectance had been changed. It was found that the length of the portion where the reflectance had been changed was 10 μm or less. Thus the amount of flow was very small.

1.5 T signal (3.7 MHz) was recorded on 2000 tracks of tracks Nos. 2001 to 4000 under the same recording condition as that used above to measure BER. As a result, the BER value was found to be $1.5 \times 10^{-6}$. This optical recording medium was stored in an environment of 80° C. and 80% RH for 3000 hr, and information recorded on tracks Nos. 2001 to 4000 were read to measure BER. As a result, the BER value was found to be $1.6 \times 10^{-6}$. That is, the deterioration of the BER was slight, and it was found that the optical recording medium had an excellent long-term reliability.

EXAMPLE 8

Co-sputtering was conducted in the same manner as that of Example 7 with the substrate and the sputtering pressure condition being the same as those of Example 7, except that a ZnS (0.75)-AlN (0.25) (molar ratio) target and a C (graphite) target were set, the inside of the sputtering chamber was pumped down to $2.5\times10^{-4}$ Pa, and an Ar gas was introduced thereinto so that the pressure became $4.0\times10^{-1}$ Pa so that the deposition rate was 85% by mole for ZnS (0.75)-AlN (0.25) (molar ratio) and 15% by mole for C, thereby forming a 180 nm-thick first dielectric layer. Thereafter, a 25 nm-thick recording layer was formed on the first dielectric layer in the same manner as that of Example 7. Further, a 25 nm-thick second dielectric layer comprising [ZnS (0.75)-AlN (0.25)] (0.85) and C (0.15) (molar ratio) was formed on the recording layer in the same manner as that described above. Further, a 120 nm-thick reflective layer was formed thereon in the same manner as that of Example 7. Thus, the following four-layer structure was formed: substrate/first dielectric layer comprising [ZnS (0.75)-AlN (0.25)] (0.85) and C (0.15)/recording layer/second dielectric layer comprising [ZnS (0.75)-AlN (0.25)] (0.85) and C (0.15)/reflective layer. A 7 μm-thick UV-curing resin layer was provided on the reflective layer of the four layer structure to give an optical recording medium.

The optical recording medium thus prepared was subjected to measurement of mechanical characteristics in the same manner as that of Example 7. As a result, the maximum tilt was found to be 4.0 mrad. The number of recording cycles was measured and found to be 170,000. Further, the length of the portion where the reflectance had been changed was measured and found to be 10 μm or less, that is, the amount of flow was very small.

This recording medium was stored in an environment of 80° C. and 80% RH for 3000 hr, and BER was measured. It was found that the BER value was increased from the initial BER, that is, $2.7\times10^{-6}$ to $2.9\times10^{-6}$. That is, deterioration of the BER was very small, and it was found that the optical recording medium had an excellent long-term reliability.

COMPARATIVE EXAMPLE 6

Co-sputtering was conducted in the same manner as that of Example 7 under substrate, sputtering pressure and other conditions which are the same as those of Example 7, except that only a ZnS target and a $Si_3N_4$ target were set without setting the C (graphite) target, so that the deposition rate was 80% by mole for ZnS and 20% by mole for $Si_3N_4$, thereby forming a 170 nm-thick first dielectric layer. Then, a 20 nm-thick recording layer was formed thereon in the same manner as that of Example 7. Further, a 20 nm-thick second dielectric layer comprising ZnS (0.80) and $Si_3N_4$ (0.20) (molar ratio) was formed, and a 100 nm-thick reflective layer comprising Al was formed on the second dielectric layer in the same manner as that of Example 7. Thus, the following four-layer structure was formed: substrate/first dielectric layer comprising ZnS (0.80) and $Si_3N_4$ (0.20)/recording layer/second dielectric layer comprising ZnS (0.80) and $Si_3N_4$ (0.20)/ reflective layer. A 7 μm-thick UV-curing resin layer was provided on the reflective layer of the four-layer structure to give an optical recording medium.

The optical recording medium thus prepared was subjected to measurement of mechanical characteristics in the same manner as that of Example 7. As a result, the maximum tilt was found to be 6.3 mrad. Further, the number of recording cycles was measured and found to be 50,000. Further, the length of the portion where the reflectance had been changed was measured and found to be about 80 μm, that is, the amount of flow was very large.

This optical recording medium was stored in an environment of 80° C. and 80% RH for 3000 hr, and BER was measured in the same manner as that of Example 7. It was found that the BER value was increased from the initial BER value, that is, $3.1\times10^{-6}$, to $9.6\times10^{-6}$, that is, increased by three times from the initial BER value.

EXAMPLE 9

Co-sputtering was conducted in the same manner as that of Example 3 with the disk substrate and sputtering pressure conditions being the same as those of Example 3, except that a ZnSe (0.90)-TiN (0.10) (molar ratio) target, a C (graphite) target and a Te (50%)-Ge (41%)-Ga (2%)-Bi (7%) (atomic %) target as a phase change write once optical recording material were set, the inside of the sputtering chamber was pumped down to $3.0\times10^{-4}$ Pa and an Ar gas was introduced so as to have a pressure of $8.0\times10^{-1}$ Pa, so that the deposition rate was 90% by mole for ZnSe (0.90)-TiN (0.10) (molar ratio) and 10% by mole for C, thereby forming a 90 nm-thick first dielectric layer. Then, a 100 nm-thick recording layer was formed on the first dielectric layer by sputtering a Te (50%)-Ge (41%)-Ga (2%)-Bi (7%) (atomic %) target. A 130 nm-thick second dielectric layer comprising [ZnSe (0.90)-TiN (0.10)] (0.90) and C (0.10) (molar ratio) was formed on the recording layer in the same manner as that described above. Thus, the following three-layer structure was formed: substrate/first dielectric layer comprising [ZnSe (0.90)-TiN (0.10] (0.90) and C (0.10)/recording layer/ second dielectric layer comprising [ZnSe (0.90)-TiN (0.10)] (0.90) and C (0.10) (molar ratio). An 8 μm-thick UV-curing resin layer was provided on the dielectric layer of the three-layer structure to give an optical recording medium.

The optical recording medium thus prepared was subjected to measurement of mechanical characteristics in the same manner as that of Example 3. As a result, the maximum tilt was found to be 2.7 mrad. Since this optical recording medium sufficiently satisfies the ISO standard even in a single plate structure, better mechanical properties can be expected after lamination.

Further, 1.5T signal (3.7 MHz) was recorded on 2000 tracks of tracks Nos. 2001 to 4000 through the use of the same optical head as that of Example 3 under conditions of a rotational speed of 1800 rpm, a peak power of 10.0 mW and a recording pulse width of 80 ns to measure BER. As a result, the BER value was found to be $3.8\times10^{-6}$. This recording medium was stored in an environment of 80° C. and 80% RH for 3000 hr. Thereafter, tracks Nos. 2001 to 4000 were read to measure BER. As a result, the BER value was found to be $4.6\times10^{-6}$. Thus, the increase in the BER value was slight, and it was found that the optical recording medium had an excellent long-term reliability.

COMPARATIVE EXAMPLE 7

The procedure of Example 9 was repeated with the target and the substrate being the same as those of Example 9, except that no C (graphite) target was used, thereby forming the following three-layer structure: substrate/first dielectric layer comprising ZnSe (0.90) and Tin (0.10)/recording layer/ second dielectric layer comprising ZnSe (0.90) and TiN (0.10) (molar ratio). An 8 μm-thick UV curing resin layer was provided on the dielectric layer of the three-layer structure to prepare an optical recording medium.

This optical recording medium was subjected to measurement of mechanical properties in the same manner as that of Example 9. As a result, the maximum tilt was found to be 7.4 mrad. Further, the optical recording medium was stored in an environment of 80° C. and 80% RH for 3000 hr, and BER was then measured. As a result, the BER value was found to be 12 times as high as the initial BER value, that is, increased from $3.2\times10^{-6}$ to $3.9\times10^{-5}$.

What is claimed is:

1. An optical recording medium comprising a substrate a first dielectric layer, a recording layer and a second dielectric layer, said substrate, said first dielectric layer, said recording layer and said second dielectric layer being laminated in that order, at least one of said first dielectric layer and said second dielectric layer comprising a dielectric comprised of a chalcogenide and elemental carbon (C), wherein said chalcogenide is at least one member selected from the group consisting of ZnS, ZnSe and ZnTe.

2. An optical recording medium according to claim 1, wherein when the composition of said dielectric is represented by the following formula $$A(1-x)\cdot Cx$$

wherein A represents said chalcogenide, C represents carbon and x represents the molar ratio of carbon, x is in the range of from 0.02 to 0.80.

3. An optical recording medium according to claim 1, wherein said dielectric additionally comprises at least one member selected from the group consisting of metals and metalloids and their oxides, nitrides and fluorides.

4. An optical recording medium according to claim 3, wherein said oxide is at least one member selected from the group consisting of $SiO_2$, SiO, $Al_2O_3$, $TiO_2$, $Ta_2O_5$ and $ZrO_2$.

5. An optical recording medium according to claim 4, wherein when the composition of said dielectric is represented by the formula $$[A(1-y)\cdot Oy]\ (1-x)\cdot Cx$$

wherein A represents said chalcogenide, (1−x) represents the molar ratio of the chalcogenide, O represents an oxide of a metal or metalloid, y represents the molar ratio of the oxide, C represents carbon and x represents the molar ratio of carbon, y and x are in the range of from 0.02 to 0.50 and in the range of from 0.05 to 0.80, respectively.

6. An optical recording medium according to claim 3, wherein said nitride is at least one member selected from the group consisting of $Si_3N_4$, AlN, TiN, TaN and ZrN.

7. An optical recording medium according to claim 6, wherein when the composition of said dielectric is represented by the formula $$[A(1-y)\cdot Ny]\ (1-x)\cdot Cx$$

wherein A represents said chalcogenide, N represents a nitride of a metal or metalloid, y represents the molar ratio of the nitride, C represents carbon and x represents the molar ratio of carbon, y and x are in the range of from 0.02 to 0.50 and in the range of from 0.01 to 0.50, respectively.

8. An optical recording medium according to claim 3, wherein said fluoride is at least one member selected from the group consisting of $MgF_2$, $CeF_3$, LiF and $ZrF_4$.

9. An optical recording medium according to claim 8, wherein when the composition of said dielectric is represented by the formula $$[A(1-y)\cdot Fy]\cdot(1-x)\cdot Cx$$

wherein A represents said chalcogenide, F represents a fluoride of a metal or metalloid, y represents the molar ratio of the fluoride, C represents carbon and x represents the molar ratio of carbon, y and x are in the range of from 0.02 to 0.60 and in the range of from 0.05 to 0.80, respectively.

10. An optical recording medium according to claim 1, wherein said recording layer comprises a material containing at least one member selected from the group consisting of Te-Ge, Sb-Te-Ge, Sn-Te-Ge and In-Se.

11. An optical recording medium according to claim 10, wherein said recording layer comprises an Sb-Te-Ge-based material having a composition represented by the following formula $$[(Sby-Te\ (1-y)]\ (1-z)\cdot(TeO\cdot 5GeO\cdot 5)z$$

wherein y, z and each numeral represent the atomic ratio of each element, provided that $0.35 \leq y \leq 0.55$ and $0.2 \leq z \leq 0.5$.

12. An optical recording medium according to claim 11, wherein said Sb-Te-Ge-based material comprises at least one metal selected from the group consisting of palladium (Pd), nickel (Ni), silver (Ag), gold (Au), cobalt (Co), platinum (Pt), niobium (Nb) and titanium (Ti).

13. An optical recording medium according to claim 11, wherein said Sb-Te-Ge-based material contains palladium (Pd) and has a composition represented by the following formula $$[(Pdx-Sby-Te\ (1-x-y)]\ (1-z)\cdot(TeO\cdot 5GeO\cdot 5)z$$

wherein x, y, z and each numeral represent the atomic ratio of each element, provided that $0.001 \leq x \leq 0.1$, $0.45 \leq y \leq 0.65$ and $0.2 \leq z \leq 0.4$.

14. An optical recording medium according to claim 1, wherein said first dielectric layer comprises a dielectric comprised of a chalcogenide and carbon (C).

15. An optical recording medium according to claim 14, wherein said first dielectric layer has a thickness of 3 to 500 nm.

16. An optical recording medium according to claim 1, wherein said second dielectric layer comprises a dielectric comprised of a chalcogenide and carbon (C).

17. An optical recording medium according to claim 16, wherein said second dielectric layer has a thickness of 3 to 500 nm.

18. An optical recording medium according to claim 1, wherein a reflective layer is provided on said second dielectric layer.

19. An optical recording medium according to claim 18, wherein said reflective layer comprises at least one metal selected from the group consisting of aluminum (Al), gold (Au), silver (Ag) and titanium (Ti).

20. An optical recording medium according to claim 18, wherein said reflective layer comprises an Al—Hf—Pd alloy or an Al—Si—Mn alloy.

* * * * *